United States Patent
McWalter et al.

(10) Patent No.: US 7,058,898 B2
(45) Date of Patent: Jun. 6, 2006

(54) ABSTRACT USER INTERFACE MANAGER WITH PRIORITIZATION

(75) Inventors: William F. McWalter, Stirling (GB); Lisa M. Kelly, Cupertino, CA (US); Dianna L. Decristo, Venice, CA (US); Behfar Razavi, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 461 days.

(21) Appl. No.: 10/104,245

(22) Filed: Mar. 22, 2002

(65) Prior Publication Data

US 2003/0179233 A1    Sep. 25, 2003

(51) Int. Cl.
*G06F 19/00*    (2006.01)
*G06F 17/50*    (2006.01)

(52) U.S. Cl. .................. 715/762; 715/763; 715/708

(58) Field of Classification Search ............... 715/763, 715/765, 761, 762, 513, 101, 804, 708, 764
See application file for complete search history.

(56) References Cited

U.S. PATENT DOCUMENTS 6,434,447 B1 *    8/2002    Shteyn .................... 700/245
6,694,482 B1 *    2/2004    Arellano et al. ........ 715/500.1

FOREIGN PATENT DOCUMENTS

| EP | 0 752646 A | 8/1997 |
|----|------------|--------|
| WO | WO 95/29440 | 2/1995 |

OTHER PUBLICATIONS

Unknown, "*Device-Independent Support in Communication Environments*", IBM Tech. Disclosure Bulletin, IBM Corp., NY, vol. 33, No. 2, Jul. 1, 1990, p. 99-100, XP000123548 ISSN: 0018-8689.

* cited by examiner

*Primary Examiner*—Cao (Kevin) Nguyen
(74) *Attorney, Agent, or Firm*—Martine Penilla & Gencarella, LLP

(57) ABSTRACT

An invention is provided for abstracting a user interface. A request is received from an application program to present data to a user. A determination is made as to which user interface devices are currently available, and a particular user interface device is selected to present the data. Abstract controls for the selected user interface device are provided to the application program, which are then used to present the data to the user using the selected user interface device.

15 Claims, 7 Drawing Sheets

ABSTRACT USER INTERFACE MANAGER WITH PRIORITIZATION

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. 10/105,121, filed Mar. 22, 2002, and entitled "Arbitration of Communication Channel Bandwidth," (3) U.S. patent application Ser. No. 10/104,351, filed Mar. 22, 2002, and entitled "System and Method for Distributed Preference Data Services," (4) U.S. patent application Ser. No. 10/104,297, filed Mar. 22, 2002, and entitled "Asynchronous Protocol Framework," (5) U.S. patent application Ser. No. 10/104,298, filed Mar. 22, 2002, and entitled "Business-Model Agnostic Service Deployment Management Service," (6) U.S. patent application Ser. No. 10/104,295, filed Mar. 22, 2002, and entitled "Manager Level Device/Service Arbitrator," (7) U.S. patent application Ser. No. 10/104,246, filed Mar. 22, 2002, and entitled "Java Telematics System Preferences," (8) U.S. patent application Ser. No. 10/104,243, filed Mar. 22, 2002, and entitled "System and Method for Testing Telematics Software," (9) U.S. patent application Ser. No. 10/104,860, filed Mar. 22, 2002, and entitled "System and Method for Simulating an Input to a Telematics System," and (10) U.S. patent application Ser. No. 10/104,294, filed Mar. 22, 2002, and entitled "Java Telematics Emulator," which are incorporated herein be reference.

BACKGROUND OF THE INVENTION

1. Field of the Invention

This invention relates generally to telematic devices, and more particularly to an abstract public user interface manager having prioritization capabilities.

2. Description of the Related Art

The electronic content and sophistication of automotive designs has grown markedly. Microprocessors are prevalent in a growing array of automotive entertainment, safety, and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, security systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment, and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open, and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace. Thus, the heterogeneous nature of the various systems essentially eliminates any benefits of economies of scale since equipment and software must be tailored to each model permutation.

To interact with telematic systems, users generally can utilize various user interfaces, such as touch screens, control knobs, and voice commands. Unfortunately, the user interface systems can vary from system to system. As such, development of software to take advantage of the various user interfaces is difficult to develop, particularly when the exact nature of available user interface hardware is unknown at the time of development.

In view of the forgoing, there is a need for methods to abstract user interface management. The methods should allow development of telematic applications without a precise knowledge of available user interface hardware at the time of development. Moreover, the methods should allow an application to execute in different environments, each having different user interface hardware.

SUMMARY OF THE INVENTION

Broadly speaking, the present invention fills these needs by providing an abstract user interface manager with prioritization capabilities. In one embodiment, a method for abstracting a user interface is disclosed. A request is received from an application program to present data to a user. A determination is made as to which user interface devices are currently available, and a particular user interface device is selected to present the data. Abstract controls for the selected user interface device are provided to the application program, which are then used to present the data to the user using the selected user interface device.

In an additional embodiment, an abstract user interface manager for abstracting a user interface is disclosed. The abstract user interface includes an abstract context that allows an application program to abstractly interact with user interface devices that are currently available using abstract controls. In addition, the abstract user interface includes a direct context that allows the application program to interact directly with the user interface devices that are currently available using direct controls. In operation, the abstract context is capable of determining which user interface devices are currently available, and further utilizes the direct context to present data to the user.

A further method for abstracting a user interface is disclosed an additional embodiment of the present invention. An application program is provided with an interface object that provides access to an abstract context and a direct context. The abstract context allows the application program to abstractly interact with the user interface devices that are currently available using abstract controls, and the direct context allows the application program to interact directly with the user interface devices that are currently available using direct controls. A request is received from the application program to present data to a user using the abstract context, and a determination is made as to which user interface devices are currently available using the abstract context. Further, the abstract context selects a particular user interface device, and provides abstract controls for the selected user interface device to the application program. In this manner, the data is presented to the user using the selected user interface device.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
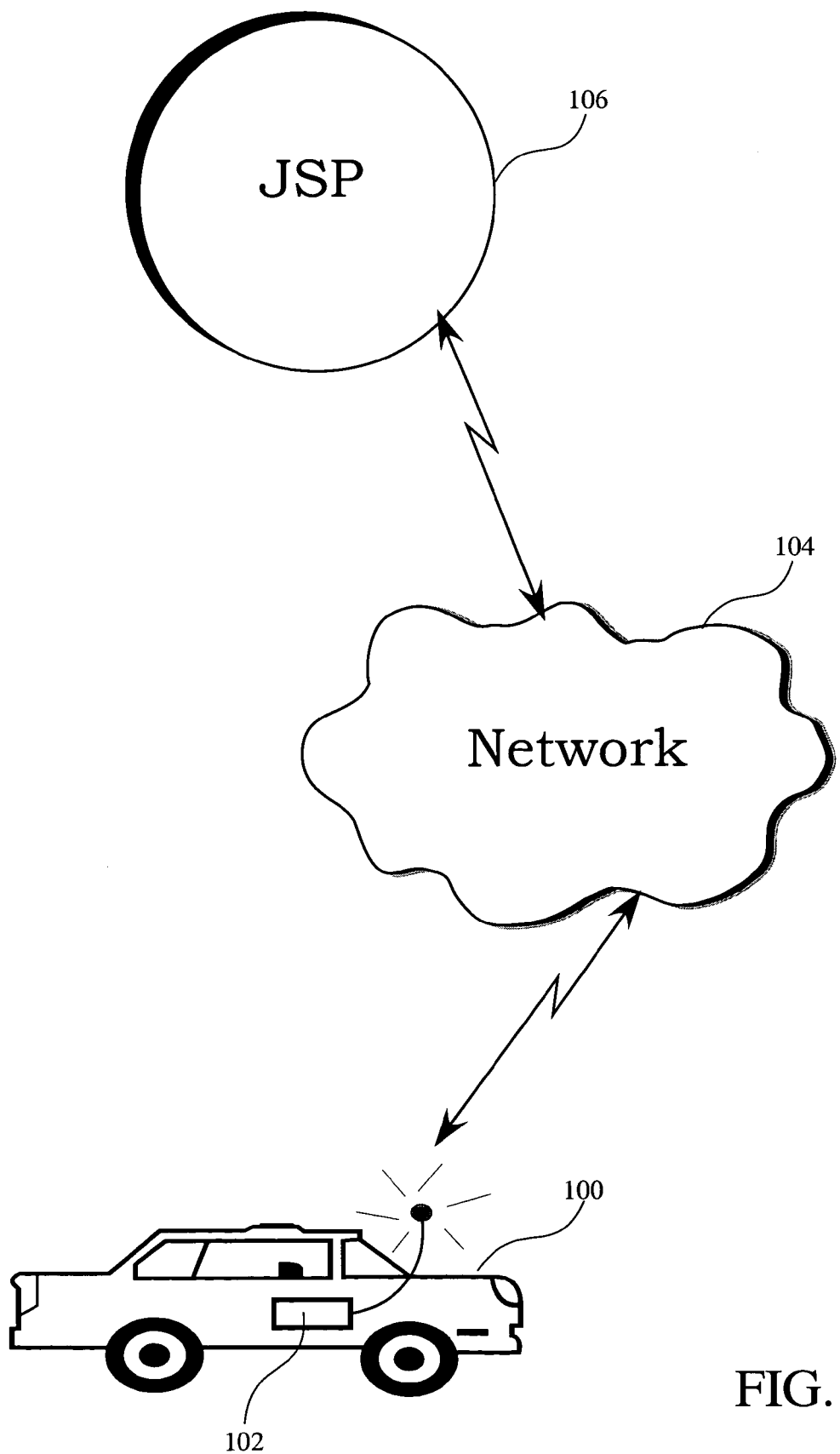
FIG. 1 is a high level schematic overview of an automotive telematics system in accordance with one embodiment of the invention.

An invention is disclosed for an abstract user interface manager with prioritization capabilities. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention provide a mechanism for vehicle client applications to interact with users without requiring the vehicle client application developer to have knowledge of all the user interface capabilities of all the vehicles on which the application will execute. As defined in greater detail below, a carlet is a Java™ application. Broadly speaking, for each function or task to be processed on the client side or between the client and server sides, a carlet is invoked to manage the operation.

Thus, embodiments of the present invention provide a public application programming interface for carlets to write to and to retrieve information from, regardless of the user interface capabilities of a particular vehicle device. In this manner, embodiments of the present invention allow a single application to execute on different vehicles having different user interface capabilities. For example, a carlet can use an abstract user interface manager of the embodiments of the present invention to execute on a vehicle having no screen, or a vehicle having a screen but no speech capabilities, or a vehicle that includes both a screen and speech capabilities.

Generally speaking, embodiments of the present invention are implanted in a client side of a telematics system. As will be explained in more detail below, the client side of a telematics system includes a telematics control unit (TCU) that is incorporated into a vehicle system. In one embodiment, the TCU is associated with a user interface (UI) that provides a user with access to control options. It should be appreciated that the user can interact with the TCU through speech recognition, a mouse type device, touch pad or some other suitable mechanism which has a minimal impact on the driver's ability to drive. Of course, a passenger of the vehicle is not limited by the restrictions on the driver with respect to the interaction with the UI.

The TCU can communicate with any of the control systems, safety systems, entertainment systems, information systems, etc., of the vehicle. It will be apparent to one skilled in the art after a careful reading of the present disclosure that the client side stack of the TCU is utilized to access a vehicle interface component for accessing in-vehicle devices, such as the speedometer, revolutions per minute (rpm) indicator, oil pressure, tire pressure, etc. Thus, client side applications sitting in the TCU allow for the functionality with respect to the vehicle systems as well as infotainment applications.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. Thus, the content or service provider is insulated against the myriad of car platforms while vehicle manufacturers are protected against hacker threats. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106, reference may be made to U.S. patent application Ser. No. 10/104,297, entitled "Asynchronous Protocol Framework," and having inventors Peter Strarup Jensen, Pavel S. Veselov, Shivakumar S. Govindarajapuram, and Shahriar Vaghar, assigned to the assignee of the present application, and which is hereby incorporated by reference.

In one embodiment, the client side includes telematics control unit (TCU) 102 contained within a land based vehicle 100. Of course, the TCU's implementation is not limited to land based vehicles, and is equally applicable to boats, planes, hovercraft, space shuttles, etc., which are all recipients of the technology defined herein. TCU 102 is enabled to communicate with network 104 through wireless access. Of course, the network 104 can be any distributed network such as the Internet and the wireless access protocol (WAP) can be any suitable protocol for providing sufficient bandwidth for TCU 102 to communicate with the network.

It should be appreciated that the client/server architecture of FIG. 1 allows for the evolution from hard wired, self-contained components to platform based offerings relying on software and upgrades. Thus, a service provider controlling the JPS 106 can deliver an unbundled, open end-to-end solution enabling plug-and-play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
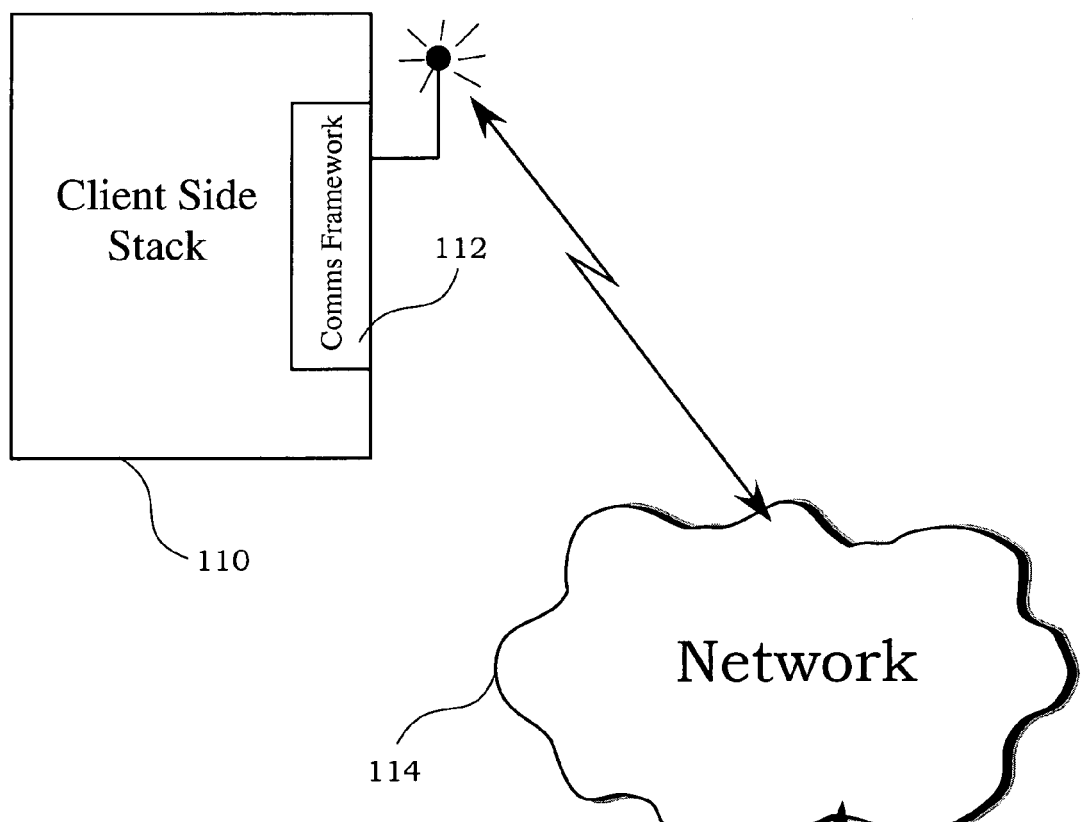
FIG. 2 is a schematic diagram of a telematics client communicating through a wireless network with a telematics server in accordance with one embodiment of the invention.
Figure 2:
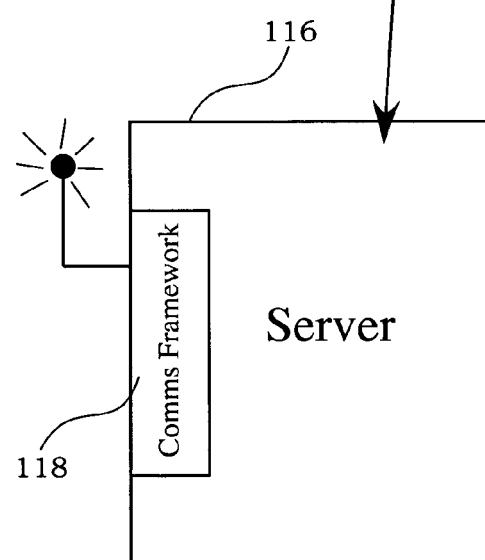

FIG. 2 is a schematic diagram of a telematics client communicating through a wireless network with a telematics server in accordance with one embodiment of the invention. A client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114.

It should be appreciated that the server 116 is not limited to a wireless connection. For example, the server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
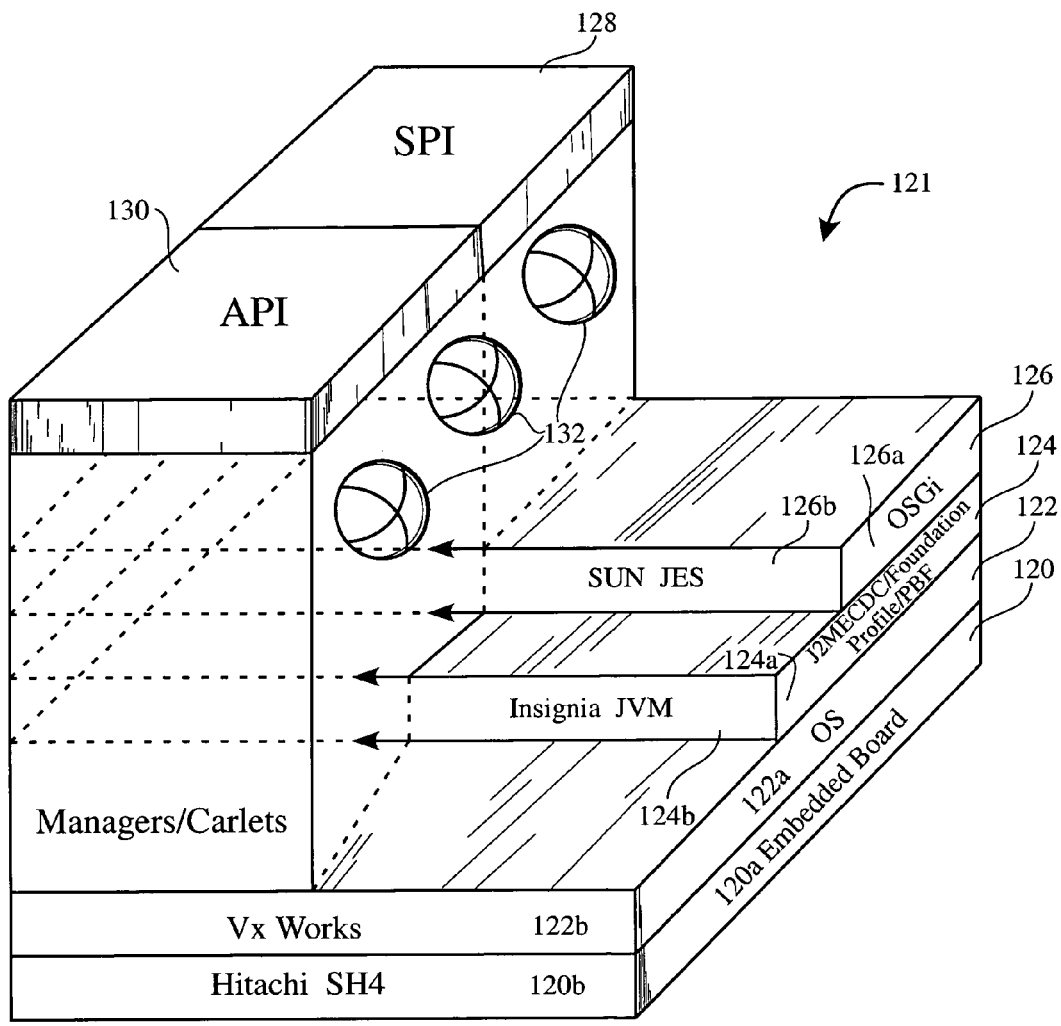
FIG. 3 is a three dimensional pictorial representation of a telematics client reference implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client, which can include an embedded board containing a telematics control unit (TCU). As mentioned above, with reference to FIG. 1, the TCU is incorporated into a land based vehicle. In one embodiment, the TCU is in communication with the electronic components of a vehicle through a vehicle bus, or by other means. These components include the measurement of vehicle operating and safety parameters, such as tire pressure, speed, oil pressure, engine temperature, etc., as well as information and entertainment components, such as audio system settings, Internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 3, an operating system layer 122 is above the hardware layer 120. In addition, a Java virtual machine (JVM) layer 124 is above the operating system (OS) layer 122 and an open services gateway initiative (OSGI) layer 126 is located above the JVM layer 124. It should be appreciated that the standard for JVM layer 124 can include the Java 2 Platform Micro Edition (J2ME), Connected Device Configuration (CDC), Foundation Profile, Personal Profile, or Personal Basis Profile. One skilled in the art will appreciate that J2ME Foundation Profile is a set of APIs meant for applications running on small devices that have some type of network connection, while J2ME Personal Profile provides the J2ME environment for those devices with a need for a high degree of Internet connectivity and web fidelity.

The exemplary standards for each of the layers of the stack are provided on the right side of client side reference implementation 121. In particular, OSGI 126a, J2ME 124a, OS 122a, and embedded board 120a are standards and to the left of the standards are examples of actual products that implement the standards. For example, OSGI 126a standard is implemented by Sun's Java Embedded Server (JES) 2.1 126b, J2ME 124a standard is implemented by Insignia's Virtual Machine 124b, OS 122a is implemented by Wind River's VxWorks real time operating system 122b, and embedded board 120a is an embedded personal computer based board such as Hitachi's SH4. It should be appreciated that the actual products are exemplary only and not meant to be limiting as any suitable product implementing the standards can be utilized.

Carlets 132 of FIG. 3, have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGi defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As used herein, a carlet is a Java™ application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, engine temperature monitoring, etc.), and to control or monitor applications to be processed by the telematics control unit (TCU) and interacted with using the on-board automobile monitor. As such, specialized carlets can be written to control the audio system, entertainment modules (e.g., such as on-line games or movies), voice recognition, telecommunications, email communications (text and voice driven), etc. Accordingly, the type of carlets that can be written is unlimited.

As mentioned previously, embodiments of the present invention provide a mechanism for vehicle client applications to interact with users without requiring the vehicle client application developer to have knowledge of all the user interface capabilities of all the vehicles on which the application will execute. Thus, embodiments of the present invention provide a public application programming interface for carlets to write to and to retrieve information from, regardless of the user interface capabilities of a particular vehicle device. In this manner, embodiments of the present invention allow a single application to execute on different vehicles having different user interface capabilities. For example, a carlet can use an abstract user interface manager of the embodiments of the present invention to execute on a vehicle having no screen, or a vehicle having a screen but no speech capabilities, or a vehicle that includes both a screen and speech capabilities.

Figure 4:
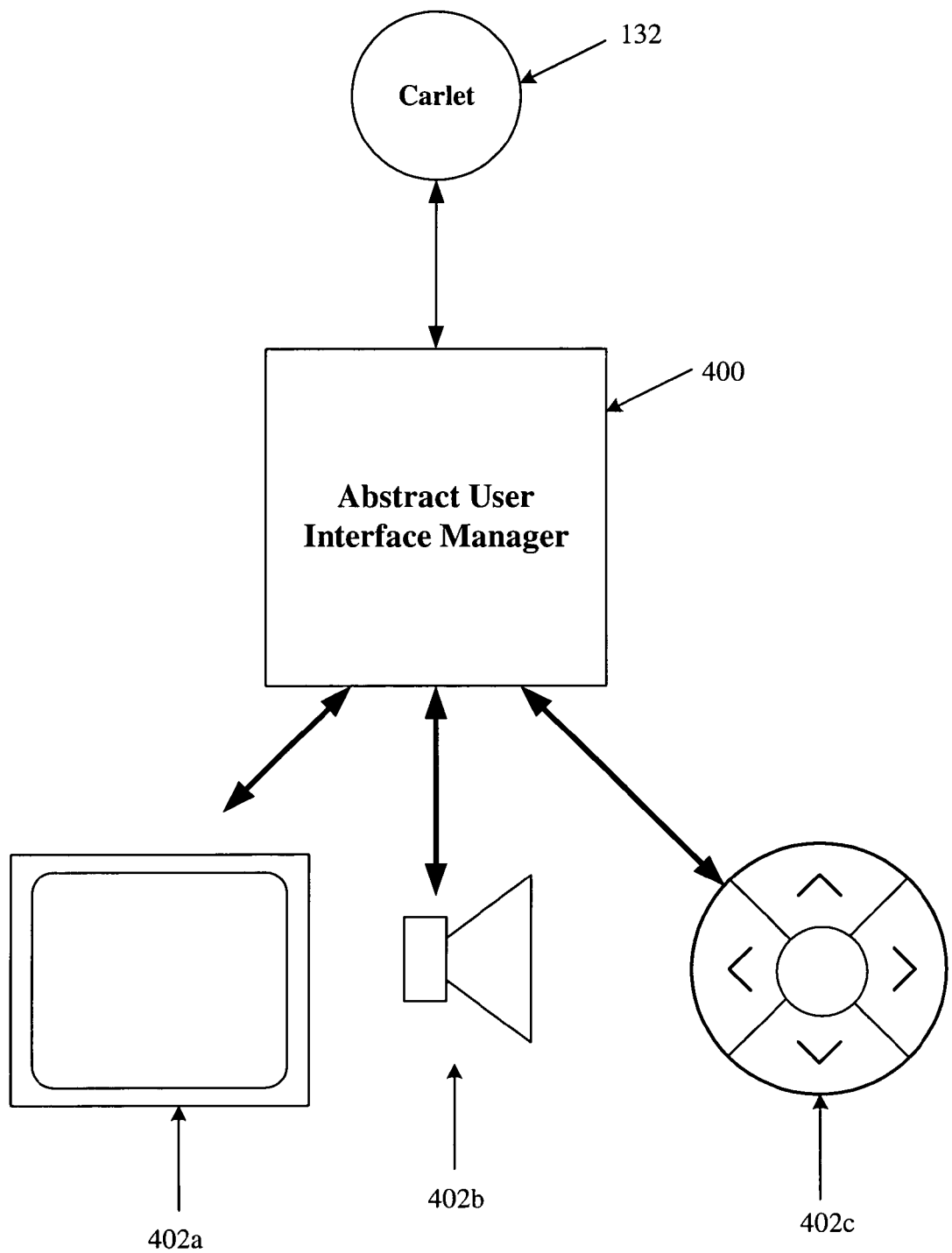
FIG. 4 is a diagram showing an exemplary abstract user interface management system, in accordance with an embodiment of the present invention.

FIG. 4 is a diagram showing an exemplary abstract user interface management system, in accordance with an embodiment of the present invention. As shown in FIG. 4, an abstract user interface management system includes an abstract user interface manager 400, which is in communication with a carlet 132 and a plurality of vehicle user interface devices 402a–402c. Broadly speaking, the abstract user interface manager 400 provides a single API to the carlet 132 and handles how information is to be presented in a vehicle specific manner.

In operation, the carlet 132 utilizes the abstract user interface manager 400 to access the vehicle user interface devices 402a–402c. For example, the carlet 132 can provide the user a list of choices to select from. The abstract user interface manager 400 of the embodiments of the present invention can determine which vehicle user interface devices 402a–402c are available and present the list of choices to the user using the available devices. For example, if screen interface 402a is available, the abstract user interface manager 400 can present the list of choices to the user by displaying the choices on the screen interface 402a. On the other hand, if the screen interface 402a is not available, but a speech interface 402b is available, the abstract user interface manager can present the list of choices to the user using the speech interface 402b.

Similarly, the abstract user interface manager 400 determines how information is obtained from the user based on the available vehicle user interface devices 402a–402c. For example, the user may make a selection using a button control interface 402c. On the other hand, if the button control interface 402c is not present, but a speech interface 402b is present, the abstract user interface manager 400 can obtain the selection information from the user using voice recognition.

In addition, carlets 132 are allowed to access the vehicle user interface devices 402a–402c directly. That is, when particular vehicle user interface devices 402a–402c are known to be present, a carlet 132 can be designed to utilize the vehicle user interface devices 402a–402c directly. In this manner, functions available only on particular vehicle user interface devices 402a–402c can be fully utilized. Thus, embodiments of the present invention allow carlets 132 to interact both abstractly and directly with vehicle user interface devices 402a–402c.

Figure 5:
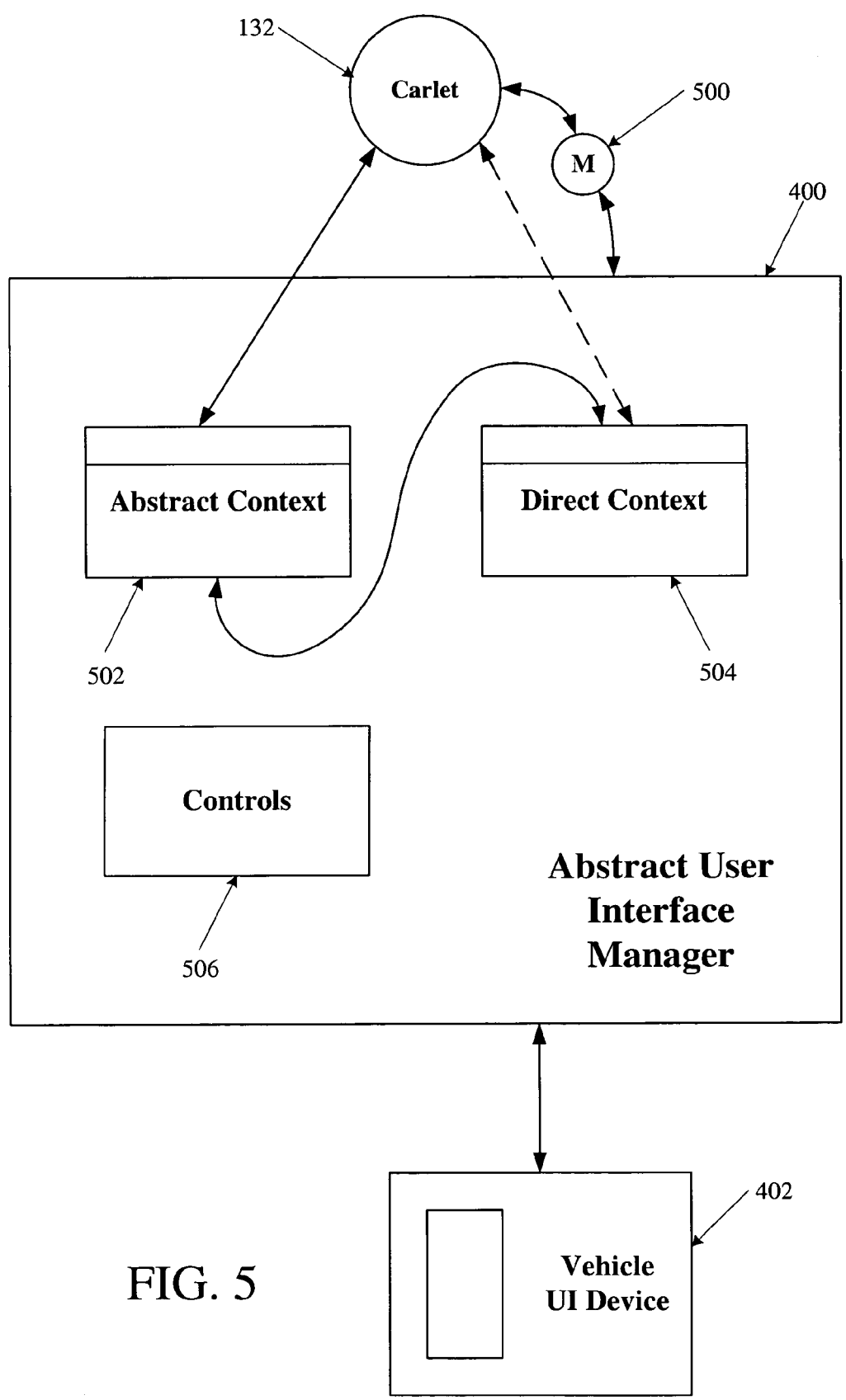
FIG. 5 is a block diagram showing an exemplary abstract user interface manager, in accordance with an embodiment of the present invention.

To achieve the above-mentioned functionality, embodiments of the present invention utilize metacarlets to transfer the information the carlet 132 wants to present to the user and the information the carlet 132 wants to receive from the user. FIG. 5 is a block diagram showing an exemplary abstract user interface manager 400, in accordance with an embodiment of the present invention. As described in greater detail subsequently, the abstract user interface manager provides both an abstract context 502 and a direct context 504 for carlets 132 to access vehicle user interface devices.

Initially, the carlet 132 obtains a metacarlet 500 from the abstract user interface manager 400. The metacarlet is the main interaction point between the carlet 132 and the abstract user interface manager 400. Once the carlet 132 obtains the metacarlet 500 from the abstract user interface manager 400, the carlet 132 can obtain the user interface context. As mentioned above, two contexts are available to a carlet 132, namely, the abstract context 502 and the direct context 504. Both the abstract context 502 and the direct context 504 allow the carlet to retrieve controls 506 from the abstract user interface manager 400. Generally, if the carlet 132 does not know the capabilities of the in-vehicle user interface, the carlet 132 can utilize the abstract context 502. On the other hand, if the in-vehicle user interface capabilities are known, the carlet 132 can utilize the direct context 504.

Upon obtaining an abstract context 502, the carlet 132 can obtain abstract controls 506 from the abstract user interface manager 400. In one embodiment, the carlet 132 knows the best controls to utilize for presenting its information to the user, however, the carlet 132 does not know which vehicle user interface devices, and hence which controls, are available. The abstract user interface manager 400 handles selecting an available control and presenting the information to the user. For example, an abstract graphics control can be used to display graphics content. However, the exact nature of the actual display device may not be known to the carlet 132. In this case, the abstract user interface manager 400 receives the request to display the image from the carlet 132, and uses the direct context 504 controls to display the image utilizing the actual in-vehicle user interface device. For example, if the screen displays only black and white images, the abstract user interface manager 400 handles conversion of the image into data displayable on the in-vehicle screen.

In one embodiment, the carlet provides a list of data, typically representing a list of selections, to the abstract user interface manager. For example, the carlet 132 can provide the abstract user interface manager 400 with a list of radio stations. If the vehicle only includes a speech user interface, the abstract user interface manager 400 will be aware of this and route the data to the speech user interface using the direct context 504. In this case, the carlet 132 presents the abstract user interface manager 400 with a list and later obtains a response from the abstract user interface manager 400, the response generally being one of the selections from the list. Using the abstract context 502, the carlet 132 does not need to be aware of which actual in-vehicle user interface device was utilized to present the information or which user interface device was used to receive the response from the user.

When using the abstract context 502, carlet 132 can further group data presented to the abstract user interface manager 400 using association abstract controls. By associating groups of data, the carlet 132 can inform the abstract user interface manager 400 on how to group the information when presented to the user. Generally, an association is used to inform the abstract user interface manager 400 on how to display data when the in-vehicle user interface cannot present all the data at once.

Figure 6:
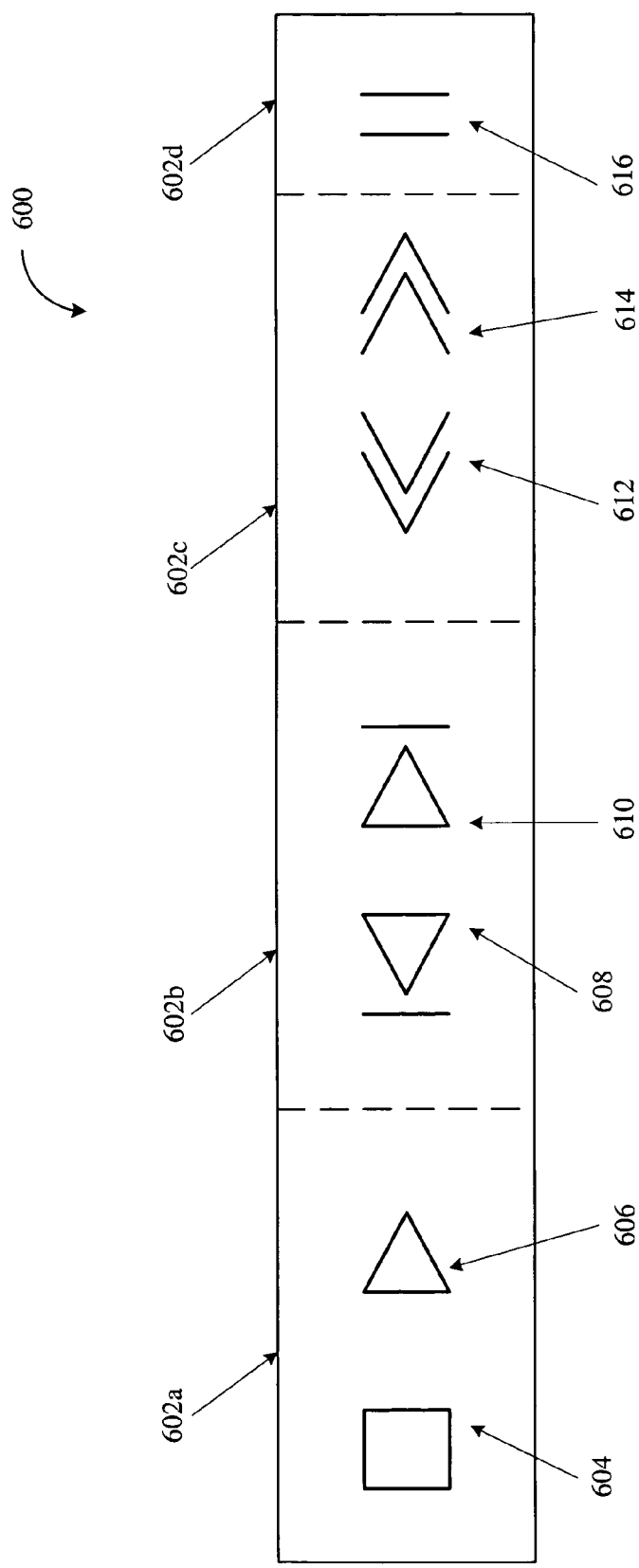
FIG. 6 is a diagram showing a graphic image for use in interfacing with a compact disk player.

For example, FIG. 6 is a diagram showing a graphic image 600 for use in interfacing with a compact disk player. In particular, the graphic image 600 shows buttons for stop 604, play 606, previous track 608, next track 610, reverse 612, fast forward 614, and pause 616. In addition, the graphic image data 600 has specific controls associated with each other. In particular, a first association 602a associates the stop 604 and play 606 controls, and a second association 602b associates the previous track 608, next track 610 controls. In addition, a third association 602c associates the reverse 612, fast forward 614 controls, and a fourth association 602b includes the pause 616 control. In this manner, when the abstract user interface manager 400 can only display a portion of the controls on an in-vehicle device, the associations 602a–602d help the abstract user interface manager 400 to decide how to display them.

Figure 7A:
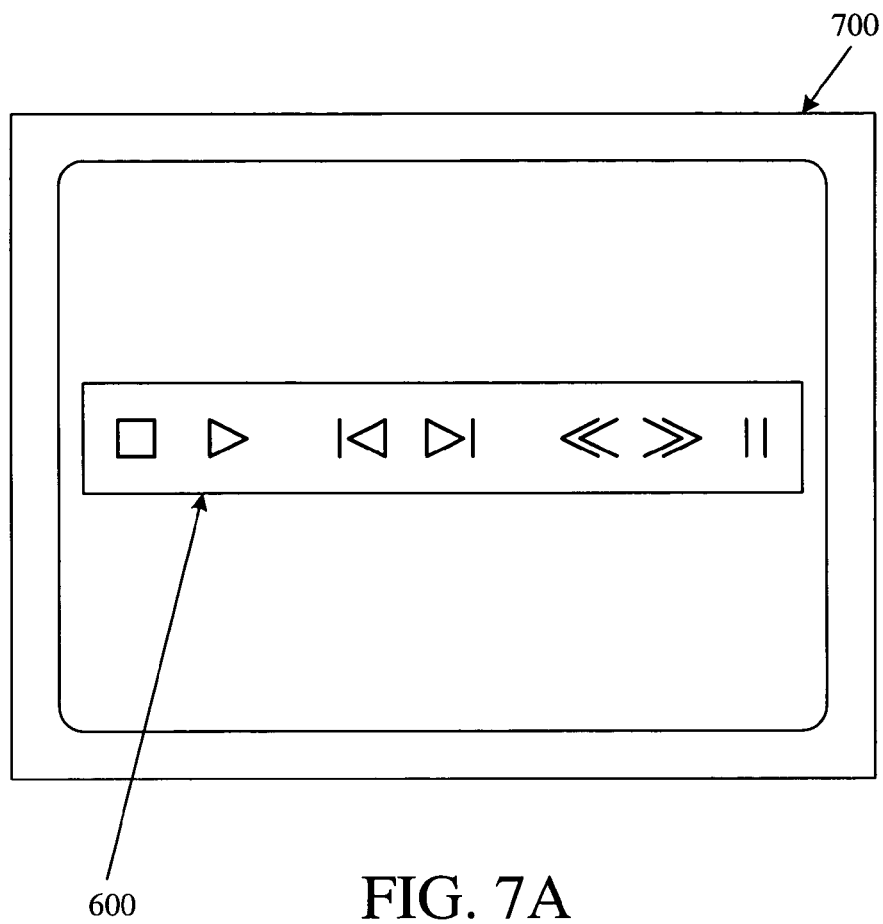
FIG. 7A illustrates an in-vehicle screen large enough to display the entire control image of FIG. 6.

For example, FIG. 7A illustrates an in-vehicle screen 700 large enough to display the entire control image 600. Thus, the abstract user interface manager can utilize the direct context to display the entire control image 600 at once. However, screen widths can vary from one in-vehicle device to another. As such, a particular in-vehicle screen may not be large enough to display the entire control image 600, as shown in FIG. 7B.

Figure 7B:
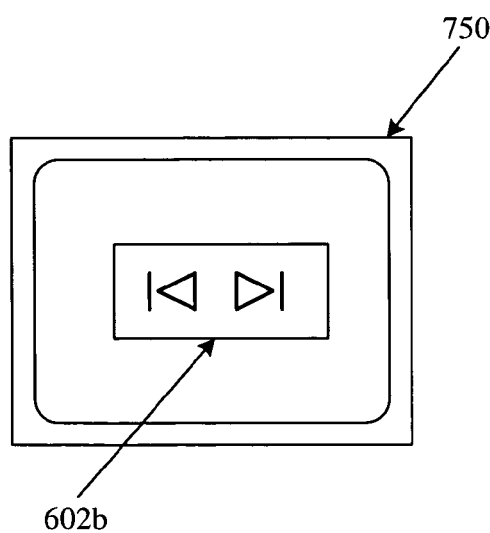
FIG. 7B illustrates association as it relates to an in-vehicle screen that is too small to display the entire control image of FIG. 6.

FIG. 7B illustrates an in-vehicle screen 750 that is too small to display the entire control image 600 of FIG. 6. In this case, the abstract user interface manager 400 can select a portion on the entire control image 600 for display based on the associations 602a–602d provided by the carlet 132. In the example of FIG. 7B, the in-vehicle screen 750 is only large enough to display two controls at a time. As such, the abstract user interface manager 400 can select one of the associations 602a–602d to display at once. For example, the abstract user interface manager 400 can display the second association 602b having the previous track and next track controls.

In one embodiment, each carlet has a priority. The abstract user interface manager presents data of the carlet having the highest priority. This can include pre-empting if a device is in use and a request from a higher priority device is received. For a detailed description of prioritization and service arbitration, reference may be made to U.S. patent application Ser. No. 10/104,295, entitled "Manager Level Device/Service Arbitrator," and having inventors Darryl J. Mocek and Terrence Barr, assigned to the assignee of the present application, and which is hereby incorporated by reference.

As an overview, the Java virtual machine (JVM) is used as an interpreter to provide portability to Java applications. In general, developers design Java applications as hardware independent software modules, which are executed by Java virtual machines. The Java virtual machine layer is developed to operate in conjunction with the native operating system of the particular hardware on which the communications framework 516c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for abstracting a user interface, comprising the operations of:
   receiving a request from an application program to present data to a user, the request being communicated through an abstract user interface manager that will handle the request through one or both of an abstract context and a direct context, the abstract user interface further executing the operations of,
   determining which user interface devices are currently available based on the request from the application program, such that if the application is aware of the context, the processing is performed by the direct context and if the context is not known, the processing is performed by the abstract context that links through the direct context;
   selecting a particular user interface device to service the request from the application program;
   providing abstract controls for the selected user interface device to the application program;
   presenting the data to the user using the selected user interface device.

2. A method as recited in claim 1, wherein the direct context allows the application program to interact directly with the user interface devices that are currently available using direct controls.

3. A method as recited in claim 2, wherein the abstract context allows the application program to interact with the user interface devices that are currently available using abstract controls.

4. A method as recited in claim 3, wherein the abstract context utilizes the direct context to interact with the user interface devices that are currently available.

5. A method as recited in claim 4, wherein the request is received using an abstract context code segment.

6. A method as recited in claim 5, wherein the request is a list of data to be presented to the user.

7. A method as recited in claim 6, wherein the abstract context utilizes the direct context to present the list of data to the user via a currently available user interface device.

8. A method as recited in claim 7, wherein the direct context receives a response from the currently available user interface device and communicates the response to the abstract context.

9. A method as recited in claim 8, wherein the abstract context provides the response to the application program, wherein the response is formatted in a generic manner.

10. An abstract user interface manager for abstracting a user interface, comprising:
    an abstract context that allows an application program communicating through the abstract user interface manager to abstractly interact with user interface devices that are currently available using abstract controls;
    a direct context that allows the application program communicating through the abstract user interface manager to interact directly with the user interface devices that are currently available using direct controls; and
    an interface object that is provided to the application program,
    wherein the abstract context is capable of determining which user interface devices are currently available, and wherein the processing is performed by the direct context if the context is known and if the context is not known processing is performed by the abstract context that links through the direct context to present data to the user, and wherein the interface object provides access to the abstract context and access to the direct context through the abstract user interface manager.

11. An abstract user interface manager as recited in claim 10, wherein the abstract context is used to receive a request to present data to the user.

12. An abstract user interface manager as recited in claim 11, wherein the request is a list of data to be presented to the user.

13. An abstract user interface manager as recited in claim 12, wherein the abstract context utilizes the direct context to present the list of data to the user via a currently available user interface device.

14. An abstract user interface manager as recited in claim 13, wherein the direct context receives a response from the currently available user interface device and communicates the response to the abstract context.

15. An abstract user interface manager as recited in claim 14, wherein the abstract context provides the response to the application program, wherein the response is formatted in a generic manner.

* * * * *